(12) United States Patent
Reddy (10) Patent No.: US 10,623,830 B1
(45) Date of Patent: Apr. 14, 2020

(54) DUAL-REPRESENTATION STREAMING FRAMES

(71) Applicant: Facebook, Inc., Menlo Park, CA (US)

(72) Inventor: Bakkama Srinath Reddy, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/219,325

(22) Filed: Dec. 13, 2018

(51) Int. Cl.
*H04N 21/84* (2011.01)
*H04N 21/845* (2011.01)
*H04L 29/06* (2006.01)

(52) U.S. Cl.
CPC ..... *H04N 21/8455* (2013.01); *H04L 65/1093* (2013.01); *H04L 65/601* (2013.01); *H04N 21/8456* (2013.01)

(58) Field of Classification Search
None
See application file for complete search history.

(56) References Cited

U.S. PATENT DOCUMENTS

| 2010/0199322 | A1* | 8/2010 | Bennett | H04N 21/2368 725/114 |
| 2014/0189002 | A1* | 7/2014 | Orioli | H04L 67/22 709/204 |
| 2018/0278669 | A1* | 9/2018 | Davies | H04L 65/602 |

* cited by examiner

*Primary Examiner* — Eileen M Adams
(74) *Attorney, Agent, or Firm* — FisherBroyles, LLP (57) ABSTRACT

Systems and methods for dual-representation streaming frames include (1) determining that a new endpoint is attempting to join a real-time video session (e.g., by receiving a real-time video stream made up of a series of frames) and (2) adding the endpoint to the real-time video session by (i) transmitting, to the endpoint, an initial frame that takes the form of an independent frame and (ii) after transmitting the initial frame, transmitting a series of subsequent frames consisting of only dependent frames, such that the only independent frame transmitted to the endpoint while the endpoint maintains its connection to the real-time video session is the initial frame. Various other methods, systems, and computer-readable media are also disclosed.

20 Claims, 6 Drawing Sheets

100

110
Determining that a new endpoint is attempting to join a live streaming session 120
Adding the endpoint to the live streaming session by (i) transmitting, to the endpoint, an initial frame, of a live media stream, that takes the form of an independent frame and (ii) after transmitting the initial frame, only transmitting dependent frames as long as the endpoint maintains its connection to the live streaming session

DUAL-REPRESENTATION STREAMING FRAMES

BACKGROUND

Traditional real-time video streaming (e.g., for live media streaming and/or real-time communications) requires a regular pattern of key-frames to provide random access to the stream. Random access is necessary to (1) allow new clients to join the stream, (2) allow clients experiencing technical difficulties to re-enter the stream, and/or (3) allow clients to jump backward or forward within the stream. However, due to the large size of key-frames, traditional real-time video streams require a large amount of network bandwidth, which may disrupt network behavior and latency. Some strategies for responding to the large bandwidth required by traditional real-time video streams is to compensate for the size of key-frames by reducing the size of other frames (e.g., p-frames and/or b-frames) within a stream. However, this may reduce the overall quality (e.g., video quality) of a real-time video stream. The instant disclosure therefore identifies a need for improved systems and methods for allowing random access to real-time video streams with minimal use of key-frames.

SUMMARY

As will be described in greater detail below, the instant disclosure describes various systems and methods for providing random access to real-time video streams while minimizing key-frame overhead. In one example, a computer-implemented method may include (1) determining that a new endpoint is attempting to join a real-time video session (e.g., by receiving a real-time video stream made up of a series of frames) and (2) adding the endpoint to the real-time video session by (i) transmitting, to the endpoint, an initial frame that takes the form of an independent frame and (ii) after transmitting the initial frame, transmitting a series of subsequent frames consisting of only dependent frames, such that the only independent frame transmitted to the endpoint while the endpoint maintains its connection to the real-time video session is the initial frame.

In some examples, the method may further include selecting a subset of the frames within the real-time video stream. These selected frames may be interspersed among non-selected frames at a predetermined frequency. For each selected frame, the method may include maintaining two versions of the frame: an independent version (which may take the form of an intra-coded picture frame) and a dependent version (which may take the form of a predicted picture frame). For each non-selected frame, the method may include maintaining only a dependent version of the frame. In these examples, (1) the initial frame transmitted to the endpoint may represent the independent version of a particular selected frame and/or (2) transmitting the series of subsequent frames consisting of only dependent frames may include transmitting the dependent version of each subsequent selected frame that is transmitted after the particular selected frame. In one embodiment in which the method includes selecting a subset of the frames, the method may further include configuring each dependent frame that follows a selected frame to not refer to any frame prior to the selected frame.

In some examples in which the method includes transmitting the independent version of a particular selected frame to the endpoint as the initial frame, the method may also include transmitting the dependent version of the particular selected frame to one or more pre-existing endpoints that joined the real-time video session prior to the transmission of the particular selected frame. In these examples, each of the pre-existing endpoints may have received, as its initial frame upon joining the real-time video session, an independent version of a previous selected frame. Then, after receiving the independent version of the previous selected frame, the pre-existing endpoint may receive only dependent versions of each subsequently transmitted selected frame as long as the pre-existing endpoint maintains its connection to the real-time video session.

In some embodiments, the method may further include, after transmitting the series of subsequent frames consisting of only dependent frames, determining that the endpoint has disconnected from the real-time video session and then reconnected to the real-time video session. In response to this determination, the method may include (1) transmitting an additional initial frame that takes the form of an independent frame and (2) after transmitting the additional initial frame, transmitting an additional series of subsequent frames consisting of only dependent frames such that the only independent frame transmitted to the endpoint, while the endpoint maintains its re-connection to the real-time video session, is the additional initial frame.

In one example, the real-time video session may represent a live streaming session and the real-time video stream may represent a live media stream. In this example, the method may further include enabling a member of a social networking platform to broadcast the real-time video stream as part of a social media post created by the member. In this example, determining that the endpoint is attempting to join the real-time video session may include determining that the endpoint is attempting to access the social media post. Additionally or alternatively, the real-time video session may represent a real-time video conference between multiple endpoints. In this example, determining that the endpoint is attempting to join the real-time video session may include determining that the endpoint is attempting to join the real-time video conference.

In one embodiment, a system for implementing the above-described method may include a (1) determination module, stored in memory, that determines that a new endpoint is attempting to join a real-time video session (e.g., by receiving a real-time video stream made up of a series of frames) and (2) a streaming module, stores in memory, that adds the endpoint to the real-time video session by (i) transmitting, to the endpoint, an initial frame that takes the form of an independent frame and (ii) after transmitting the initial frame, transmitting a series of subsequent frames consisting of only dependent frames, such that the only independent frame transmitted to the endpoint while the endpoint maintains its connection to the real-time video session is the initial frame. The system may also include a physical processor configured to execute the determination module and the streaming module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a new endpoint is attempting to join a real-time video session (e.g., by attempting to receive a real-time video stream made up of a series of frames) and (2) add the endpoint to the real-time video session by (i) transmitting, to the endpoint, an initial frame that takes the form of an independent frame and (ii) after transmitting the initial frame, transmitting a series of subsequent frames consisting of only dependent frames, such that the only independent frame transmitted to the endpoint while the endpoint maintains its connection to the real-time video session is the initial frame.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing random access to real-time video streams while minimizing key-frame overhead. In one example, the first frame sent from a transmitting device to an endpoint during a real-time video session may be an independent frame (e.g., a key-frame and/or intra-coded picture frame) and this may be the only independent frame sent to that endpoint during the real-time video session. Thereafter, each frame sent to the endpoint may be a dependent frame (e.g., a P-frame and/or a B-frame).

In some examples, the transmitting device may intermittently designate certain frames within the real-time video stream. For example, every Nth frame (e.g., every twentieth frame) may be designated. The transmitting device may include two representations of each designated frame: an independent representation and a dependent representation. The dependent representation may be sent to existing endpoints (that is, endpoints that were already receiving the real-time video stream prior to receiving the designated frame). The independent representation may be sent to new endpoints (that is, endpoints who joined the real-time video stream after the designated frame but before a subsequent designated frame). In some embodiments, the transmitting device may ensure that each frame following a designated frame does not refer to any frame prior to that designated frame, making the designated frame a valid random access point.

As will be explained in greater detail below, by (1) creating dual-representations of selected frames and only sending the independent representation of a selected frame to new endpoints and (2) ensuring that frames following a selected frame do not refer to any frame prior to the selected frame, the disclosed systems and methods may dramatically reduce the number of independent frames send down in a real-time video session, while enabling random access to endpoints that require it. As such, embodiments of the instant disclosure may (1) dramatically reduce the bandwidth required to transmit real-time video streams to endpoints, lessening the burden on endpoints and improving latency and buffer behavior, and (2) reduce or eliminate playback errors and the visual pulsing artifacts associated with independent frames. Thus, the instant disclosure may improve the functioning of a computer itself by increasing the computer's ability to transmit and/or receive real-time video streams.

Figure 1:
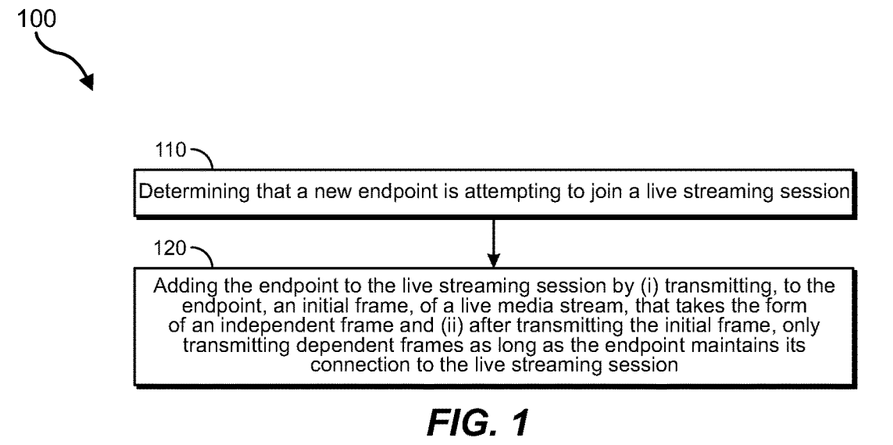
FIG. 1 is a flow diagram of an exemplary method for creating and transmitting dual-representation streaming frames.

The following will provide, with reference to FIG. 1, detailed descriptions of computer-implemented methods for providing random access to streaming media while minimizing key-frame overhead. Detailed descriptions of corresponding example systems will also be provided in connection with FIG. 2. In addition, detailed descriptions of a corresponding reply system creation flow will be provided in connection with FIGS. 3-7.

FIG. 1 is a flow diagram of an exemplary computer-implemented method 100 for transmitting real-time video streams using dual-representation frames. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a computing device 202 (e.g., as shown in exemplary system 200 in FIG. 2).

Computing device 202 generally represents any type or form of computing device capable of reading computer-executable instructions. For example, computing device 202 may represent a computing device configured to maintain a real-time video session and/or transmit a real-time video stream to one or more endpoints. In some examples, computing device 202 may perform one or more social networking functions in connection with a social networking platform. As a specific example, computing device 202 may transmit (in real time) a live media stream included in a social media post initiated by a user of the service. As an additional or alternative specific example, computing device 202 may transmit a real-time video conference (e.g., as part of a social media messenger application).

In some examples, computing device 202 may represent a backend computing device. For example, computing device 202 may represent a server maintained by a social networking platform that performs one or more social networking functions (including, for example, transmitting real-time video streams such as a live media stream and/or a real-time video conference stream). In another example, computing device 202 may represent a client device. In this example, the client device may include software (e.g., received from the social media platform) that allows the client device to transmit (in real time) a real-time video stream (e.g., using the methodology described herein).

Figure 2:
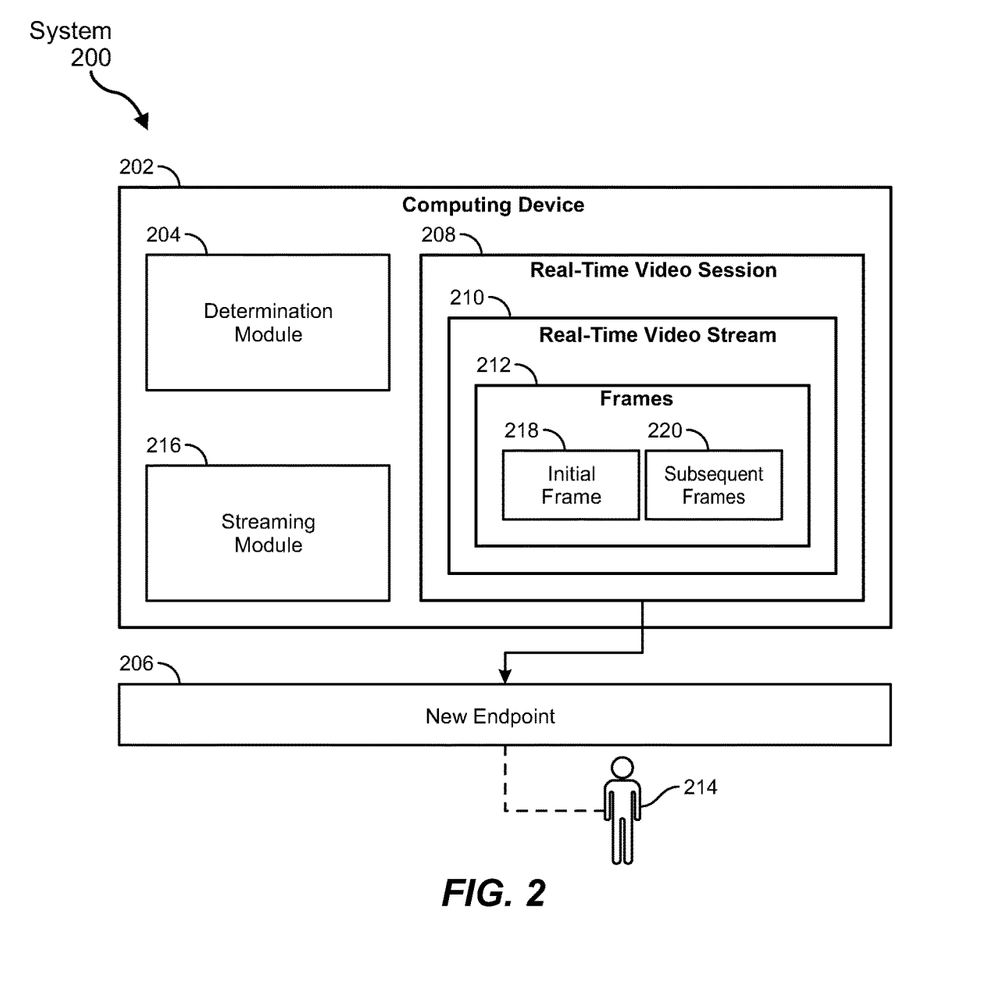
FIG. 2 is a block diagram of an exemplary system for creating and transmitting dual-representation streaming frames.
Figure 3:
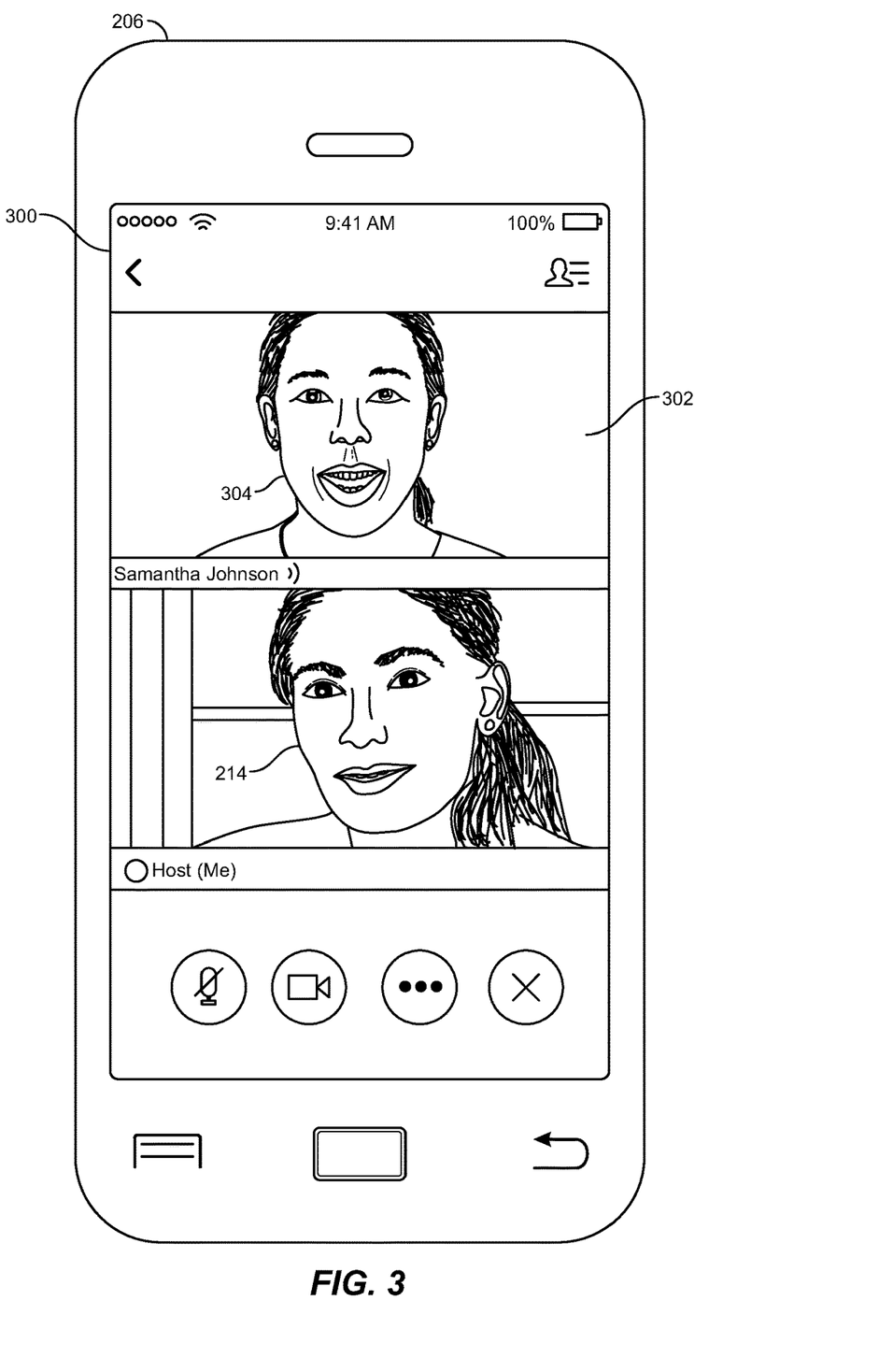
FIG. 3 is an illustration of an exemplary video conference that may rely on dual-representation streaming frames.

In certain embodiments, computing device 202 may include one or more portions of exemplary system 200 in FIG. 2. Although illustrated as a single entity in FIG. 2, computing device 202 may include and/or represent a group of multiple servers that operate in conjunction with one another.

As illustrated in FIG. 1, at step 110, one or more of the systems described herein may determine that a new endpoint is attempting to join a real-time video session (e.g., by attempting to receive a real-time video stream made up of a series of frames). For example, as illustrated in FIG. 2, a determination module 204 may determine that an endpoint 206 is attempting to join a real-time video session 208. Joining real-time video session 208 may include receiving a real-time video stream 210 made up of a series of frames 212.

As used herein, the term "endpoint" generally refers to any type or form of computing device that is capable of participating in a real-time video session by receiving a real-time video stream. An endpoint may be considered a "new" endpoint when the endpoint is new to a real-time video session (e.g., when the endpoint first joins the real-time video session and/or first rejoins the real-time video session after having disconnected from the real-time video session).

As used herein, the term "real-time video session" generally refers to any type of form of digital event that includes the sharing and/or transmission of a real-time video stream. In one embodiment, the real-time video session may refer to a live streaming session (i.e., that transmits a live media stream). In another embodiment, the real-time video session may refer to a real-time communication, such as a live video conference, in which multiple endpoints may contribute live content.

In some examples, a user must log-in to the real-time video session in order to access the real-time video stream. In other examples, a user may be joined to the real-time video session automatically (e.g., in response to selecting a push button and/or navigating to a particular webpage).

The term "real-time video stream" as used herein generally refers to any type or form of multimedia that is transmitted in real time, as a series of frames, from a transmitting device to one or more endpoints. Each frame may be displayed by an endpoint (to a user) as the frames are received (i.e., without waiting for the entire series of frames to be received). In some examples, the real-time video stream may represent a stream of video and/or audio media content. In one embodiment, the real-time video stream may represent a live media stream, such as a live announcement, news report, and/or video status update. In additional or alternative embodiment, the real-time video stream may represent a real-time communication, such as a video stream used in a video conference.

Determination module 204 may determine that endpoint 206 is attempting to join real-time video session 208 in a variety of contexts. For example, in some examples, real-time video session 208 may represent a video conference between multiple users and real-time video stream 210 may represent a live video/audio stream of one or more participants of the video conference. In this example, determination module 204 may determine that endpoint 206 is attempting to join real-time video session 208 in response to determining that endpoint 206 is attempting to join the video conference. Using FIG. 3 as a specific example, determination module 204 may determine that endpoint 206 (being used by a user 214) is attempting to join a video conference 300 that includes receiving a live stream 302 of an additional user 304.

In other examples, real-time video stream 210 may represent a live media stream and a member of a social networking platform may be attempting to broadcast real-time video stream 210 as part of a social media post created by the member. In these examples, determination module 204 may determine that endpoint 206 is attempting to join real-time video session 208 by determining that endpoint 206 is attempting to access the live media stream posted within the social media post (i.e., in order to display the live media stream to user 214 of endpoint 206 via a display element of endpoint 206). Using FIG. 4 as a specific example, determination module 204 may determine that endpoint 206 is attempting to access real-time video stream 210 included as part of a live video post 402 within a newsfeed 400.

Figure 4:
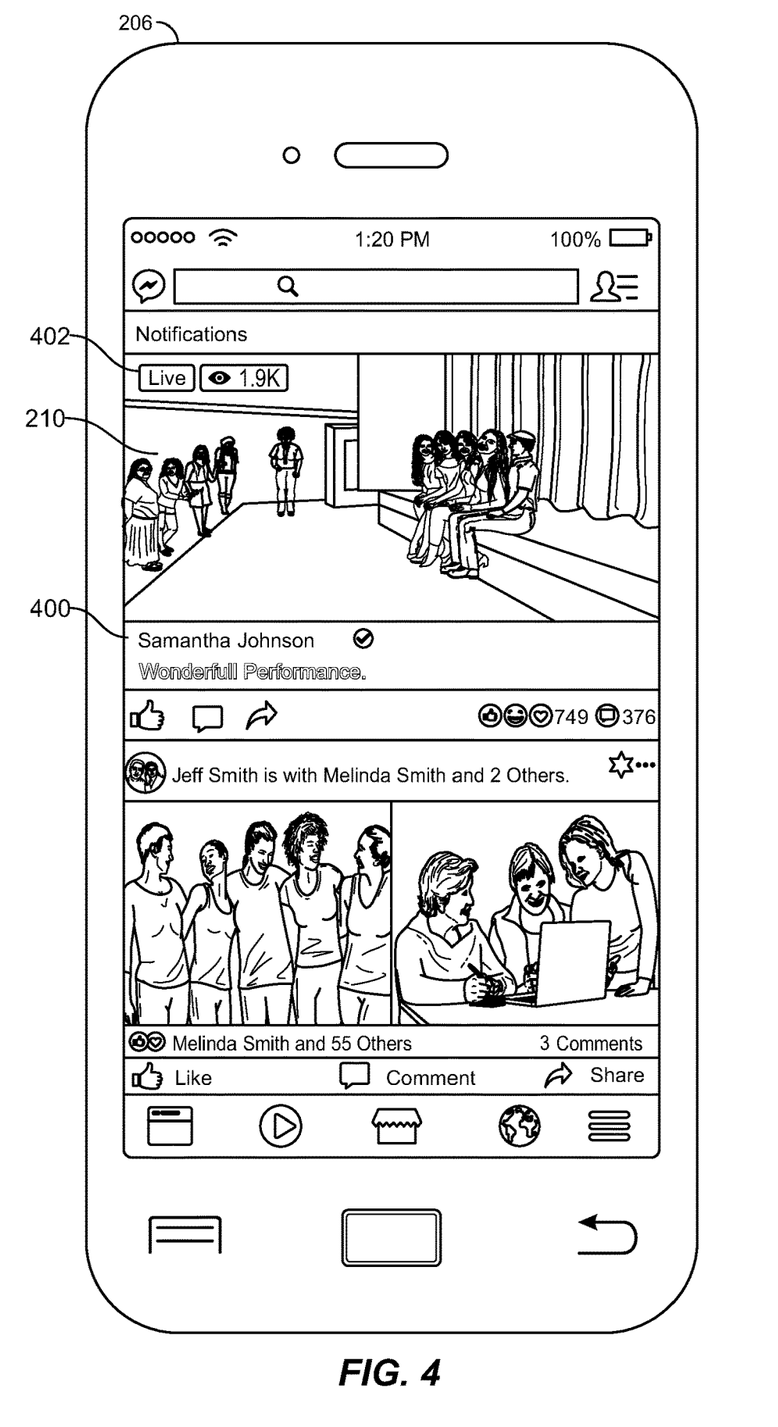
FIG. 4 is an illustration of an exemplary newsfeed with a live media post that may rely on dual-representation streaming frames.

In one example, determination module 204 may determine that endpoint 206 is attempting to access real-time video stream 210 (i.e., included as part of live video post 402) in response to determining that user 214 has scrolled to a section of newsfeed 400 that includes live video post 402. In this example, the social media platform may include a policy to automatically play videos within newsfeeds as they appear on the user's screen. In another example, determination module 204 may determine that endpoint 206 is attempting to access real-time video stream 210 (i.e., included as part of live video post 402) in response to determining that user 214 has selected live video post 402 (e.g., by clicking on the live video posts using an auxiliary device such as a digital mouse). In this example, the social media platform may include a policy to only play videos within newsfeeds in response to being selected via user input.

Returning to FIG. 1, at step 120, one or more of the systems described herein may add the endpoint to the real-time video session (e.g., in response to determining that the endpoint is attempting to join the real-time video session). For example, a streaming module 216 may add endpoint 206 to real-time video session 208. Streaming module 216 may add endpoint 206 to real-time video session 208 at least in part by transmitting real-time video stream 210 to endpoint 206 in real time. As discussed above, real-time video stream 210 may represent a series of frames (i.e., frames 212). Thus, streaming module 216 may transmit real-time video stream 210 by transmitting frames from within the series of frames to endpoint 206 in real time.

Streaming module 216 may transmit frames from real-time video stream 210 to endpoint 206 in a variety of ways. In some examples, streaming module 216 may first transmit an initial frame 218 that takes the form of an independent frame. Then, streaming module 216 may transmit a series of subsequent frames 220 that consist of only dependent frames. In these examples, the initial frame may be the only independent frame transmitted to endpoint 206 while endpoint 206 maintains its connection to real-time video session 208.

The term "independent frame" (sometimes referred to as "i-frame") refers to a frame, such as a key-frame, that is encoded (e.g., by an encoding module) without information from other frames. Thus, an independent frame may not require other frames to be decoded. In some examples, an independent frame may represent a complete image (e.g., an intra-coded picture frame), such as a JPG image file or a BMP image file. The term "dependent frame," by contrast, refers to a frame, such as a predicted picture frame (sometimes referred to as "p-frame"), that is encoded with information from one or more previous frames (that is, the dependent frame uses prediction from the one or more previous frames). Thus, the dependent frame may require previous frames to be decoded.

Figure 5:
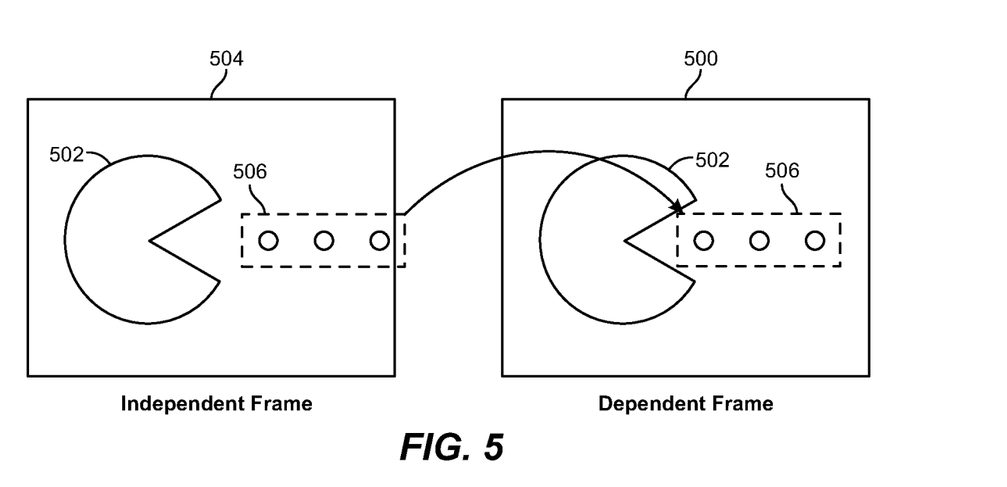
FIG. 5 is an illustration of an exemplary independent frame and an exemplary dependent frame.

In some examples, a dependent frame may only include content that has changed from a previous frame (i.e., without including content that has not changed from the previous frame). For example, as illustrated in FIG. 5, a dependent frame 500 may not include a first portion 502 that has not changed from an independent frame 504 but may include a second portion 506 that has changed from independent frame 504. Because a dependent frame may rely on data from previous frames, a dependent frame may be more compressible than an independent frame. As such, a dependent frame may be of a smaller size and may be transmitted using less bandwidth than an independent frame.

In some embodiments, streaming module 216 may be configured to select a subset of frames within frames 212. In some examples, streaming module 216 may select frames at a predetermined frequency (e.g., such that the selected frames are evenly interspersed among non-selected frames). For example, streaming module 216 may select every nth frame within frames 212 (where n is configurable). Using FIG. 6 as a specific example, streaming module 216 may select every third frame within frames 212. In other examples, the interval between selected frames may vary. In one such example, a frame may be selected in response to determining that a new endpoint is attempting to join real-time video session 208.

For each selected frame (depicted in FIG. 6 with an asterisks), streaming module 216 may maintain two versions of the frame: an independent version and a dependent version. For non-selected frames (depicted in FIG. 6 without an asterisks), streaming module 216 may maintain only a dependent version of the frame.

Streaming module 216 may create the independent version of a selected frame in a variety of ways. In a strict-conformance embodiment, the independent version may be created by reconstructing the dependent version of the selected frame and creating a lossless encode of the reconstruction frame (e.g., using a lossless compression algorithm). This embodiment may provide a perfect reconstruction without any stream errors. While this encoding process may have a low central processing unit (CPU) cost, the independent version created as a result may be larger than an independent version created using other encoding processes. As such, this embodiment may be preferred for reliable delivery, such as a Transmission Control Protocol (TCP) delivery, with a higher bitrate and/or latency tolerance. (However, as will be explained throughout, the higher delivery costs may only affect a new endpoint and may only affect the new endpoint once).

In another embodiment (i.e., a visually lossless and/or timed-recovery embodiment), the independent version of a selected frame may be created by reconstructing the dependent version of the selected frame and then creating a re-encoded/re-quantized version of the reconstructed frame. The size of the independent version may be configurable in this embodiment. A lower Constant Rate Factor (CRF) may be selected for a visually lossless experience (e.g., to be used for reliable delivery systems) or a higher CRF may be selected for a smaller frame size (e.g., to be used for unreliable delivery systems). This embodiment may introduce errors on decode. However, because bitstream errors often recover over one or two group of pictures (GOPs), the player on an endpoint receiving the real-time video stream may mitigate the errors by prefetching a first GOP in the background and displaying from a second GOP (e.g., using a Gradual-Intra-Refresh approach). This approach may be preferred for online encodes, unreliable delivery, such as Real-Time Transport Protocol (RTP) delivery, very low bitrate requirements, and/or if a player on an endpoint does not support a lossless mode.

In some embodiments, a reconstructed reference may not be available (e.g., when the encoding is performed on certain mobile devices). In these embodiments, an original frame (corresponding to a selected frame) may be encoded twice to create both an independent version and a dependent version.

Figure 6:
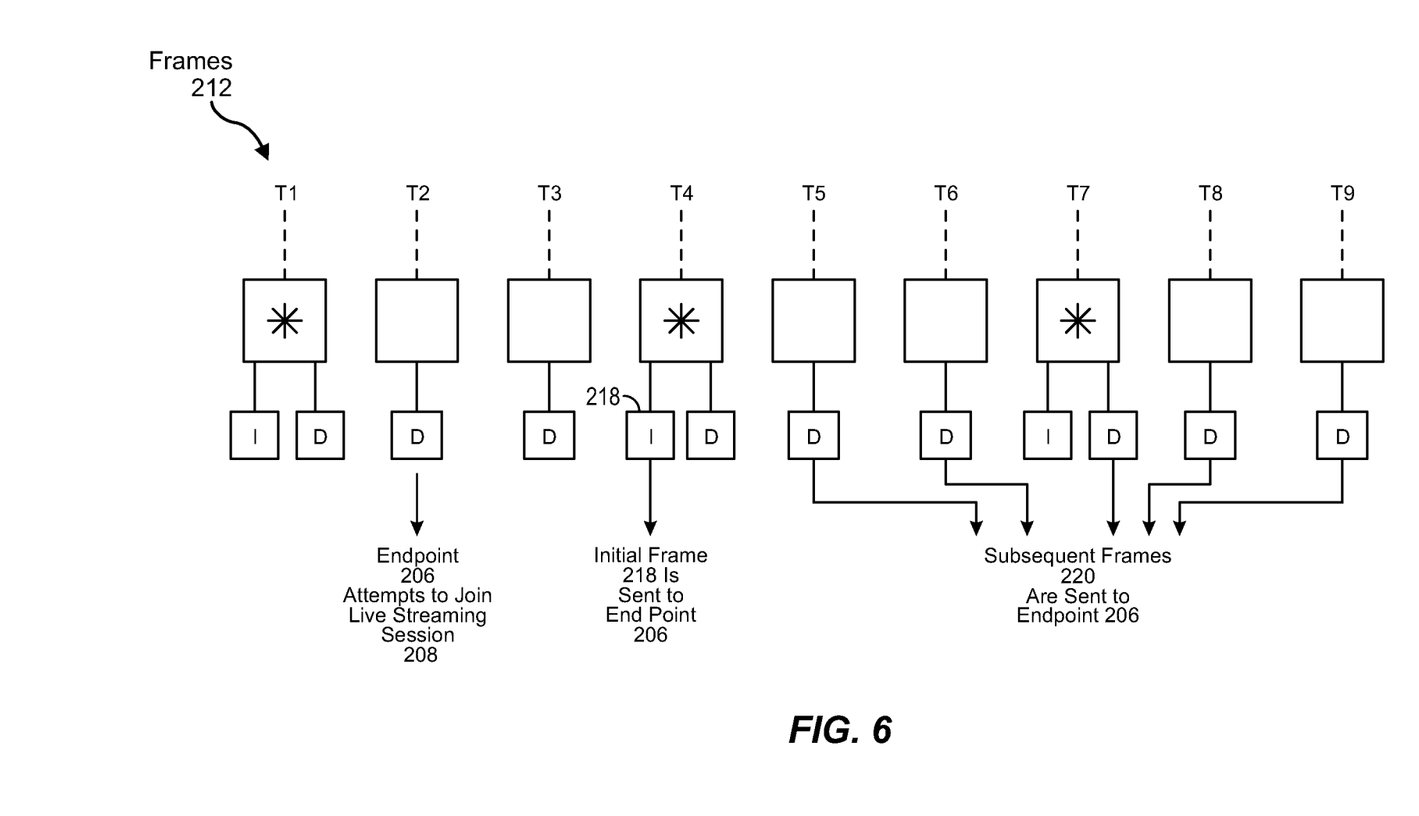
FIG. 6 is an exemplary illustration of real-time video frames and an exemplary timeline for joining an endpoint to a real-time video stream that includes the real-time video frames.

In examples in which streaming module 216 maintains two versions of selected frames, initial frame 218 transmitted to endpoint 206 may represent the independent version of a particular selected frame. In one example, the particular selected frame may represent the first selected frame to be transmitted after endpoint 206 attempts to join real-time video session 208. Returning to FIG. 6 as a specific example, each frame within frames 212 may be associated with a different time (that is, the real time at which that frame is transmitted). As shown in FIG. 6, endpoint 206 may attempt to join real-time video session 208 at Time 2 (labeled "T2" in FIG. 6). The next selected frame (that is the next dual-representation frame) to be transmitted may be the frame being transmitted at Time 4. Thus, endpoint 206 may receive, as its initial frame, the independent version of the selected frame at Time 4.

After transmitting initial frame 218, streaming module 216 may transmit the dependent version of each subsequent frame that is transmitted after the particular selected frame, while endpoint 206 maintains its connection to real-time video session 208. Returning to FIG. 6 as a specific example, the frame at Time 7 may be a selected frame with two version: an independent version and a dependent version. As shown in FIG. 6, streaming module 216 may transmit the dependent version to endpoint 206.

Figure 7:
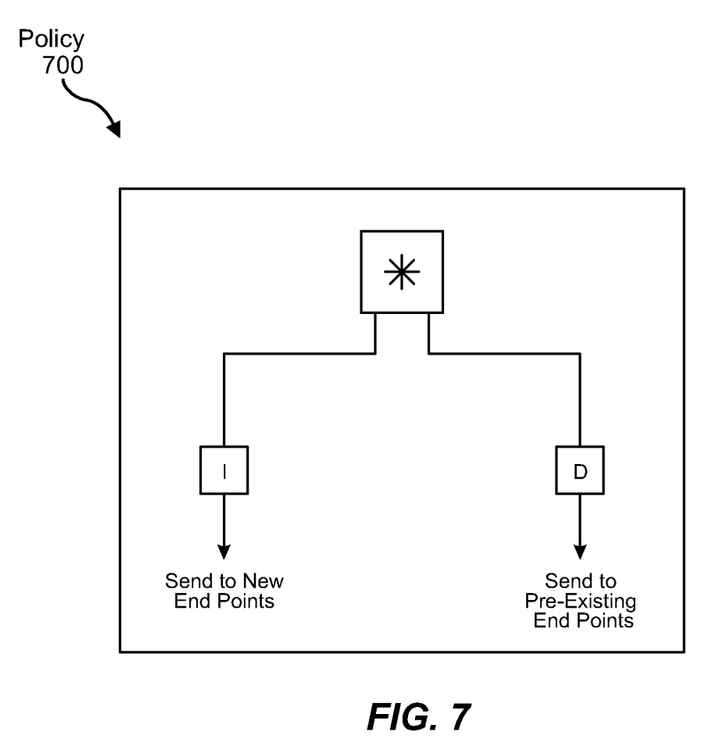
FIG. 7 is an illustration of an exemplary policy for transmitting the independent version of a selected frame to new endpoints and the dependent version of the selected frame to pre-existing endpoints.

In some examples, streaming module 216 may be operating according to a policy, such as policy 700 illustrated in FIG. 7, to send the independent version of selected frames (i.e., dual-representation frames) to new endpoints and to send the dependent version of selected frames to pre-existing endpoints. Thus, at Time 4, when endpoint 206 is a new endpoint, endpoint 206 may receive the independent version of the selected frame being transmitting at Time 4. Then, at Time 7, when endpoint 206 has become a pre-existing endpoint, endpoint 206 may receive the dependent version of the selected frame being transmitted at Time 7.

As used herein, the term "pre-existing endpoint" generally refers to any type or form of computing device joined into real-time video session 208 that has already received the independent version of a selected frame. Using FIG. 6 as a specific example, endpoint 206 may be considered a new endpoint when attempting to join real-time video session

208 at Time 2, but may be considered a pre-existing endpoint after having received initial frame 218 at Time 4.

In some examples, streaming module 216 may, in addition to transmitting initial frame 218 to endpoint 206, transmit the dependent version of initial frame 218 to one or more pre-existing endpoints that joined real-time video session 208 previously (that is, prior to the transmission of initial frame 218/the dependent version of initial frame 218). Using FIG. 6 as a specific example, an additional endpoint may have attempted to join real-time video session 208 at Time 1 and received the independent version of the selected frame at Time 1 in response. Then, at Time 4, streaming module 216 may send the dependent version of the selected frame at Time 4 to the additional endpoint (instead of sending the independent version as was sent to endpoint 206), because the additional endpoint had already received an independent frame at Time 1.

The one or more pre-existing endpoints may receive the dependent version of initial frame 218 in line with a policy, such as policy 700 and FIG. 7, to only receive the dependent versions of selected frames after having received the independent version of an initial selected frame, as long as a connection to real-time video session 208 is maintained.

In some embodiments, streaming module 216 may, in addition to creating two versions of a selected frame, ensure that each frame following a selected frame does not refer to any frame prior to that selected frame. By ensuring that each subsequent frame does to any frame prior to the selected frame, the streaming module may create (of each selected frame) a valid random access point.

In some examples, endpoint 206 may disconnect from real-time video session 208 after having gained access (e.g., due to a network error, connection problem, and/or a user selection to disconnect). After disconnecting, streaming module 216 may determine that endpoint 206 is attempting to reconnect to real-time video session 208. In these examples, streaming module 216 may (1) transmit an additional initial frame that takes the form of an independent frame and, (2) after transmitting the additional initial frame, transmitting a series of subsequent frames consisting of only dependent frames (e.g., by sending the dependent version of subsequent selected frames). Thus, the only independent frame transmitted to endpoint 206, while endpoint 206 maintains its re-connection to real-time video session 208, may be the additional initial frame.

Endpoint 206 may utilize any of a variety of different types of players to receive real-time video stream 210. For example, endpoint 206 may utilize a Dynamic Adaptive Streaming over HTTP (DASH) based player. In this example, the systems and methods described herein may maintain two manifests: (1) a first manifest that fetches the regular media stream (that is, the media stream with only dependent frames (e.g., kN+1, wherein k>0)) and (2) a second manifest (which may be optional and on-demand) that may fetch independent frames. The DASH-based player may be configured, by default, to request the regular media stream and feed the regular media stream to a media stack. However, for any random access (e.g., when endpoint 206 joins real-time video session 208), the player may first request the second manifest followed by the first manifest, which may then be fed (in succession) to the media stack.

As described throughout the instant disclosure, the disclosed systems and methods may provide systems and methods for minimizing the number of key-frames (or key-frame equivalents) sent down in a real-time video session, while enabling random access for client endpoints. In some examples, the disclosed systems and methods may include performing the following for every Nth frame in a real-time video stream: (1) Ensure that all frames following N do not refer to any frame prior to N (in decode order). (2) Generate an out-of-band alternative reference frame N* that is independently decodable. In some examples, N* may represent a lossless encode of a reconstructed frame N.

N* may have the same frame_num value as N or gaps_in_frame_num may be set in the stream. However, N* will not be included in the regular coded video sequence and will not be streamed to any existing clients (that is, client devices that were already receiving the real-time video stream prior to N). New client joining the real-time video session (or for existing clients re-joining the real-time video session) may receive N* (instead of receiving N). Thereafter, the new client will receive only regular frames. Thus, each client will only receive an N* for the very first frame in the client's session. In some examples, the number of requests for an N* may equal the number of receivers (that is, the number of client devices receiving the real-time video stream). In other examples (e.g., if a client device is experiencing technical difficulties), the number of request for an N* may be slightly higher than the number of receivers.

Because all frames following N* are guaranteed to not refer to any frame prior to N*, N* will be a valid random access point. Because existing clients receive N (not N*), N* will not impact the bitrate/buffer for existing clients, reducing or eliminating playback errors. Additionally, because the regular video stream received by each client does not contain intermittent key-frames, the stream will consume lower bandwidth and will not include the visual pulsing artifacts associated with key-frames.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a dependent version of a frame and transform the dependent version into an independent version. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   selecting a subset of frames within a real-time video stream of a real-time video session;
   for each selected frame, maintaining two versions of the selected frame, the two versions comprising an independent version and a dependent version;
   for each non-selected frame, maintaining only a dependent version of the non-selected frame;
   determining that a new endpoint is attempting to join the real-time video session, wherein joining the real-time video session comprises receiving the real-time video stream; and
   adding the endpoint to the real-time video session by:
      transmitting, to the endpoint, an initial frame that takes the form of an independent frame, wherein the initial frame comprises the independent version of a particular selected frame; and
      after transmitting the initial frame, transmitting a plurality of subsequent frames consisting of only dependent frames such that the only independent frame transmitted to the endpoint while the endpoint maintains its connection to the real-time video session is the initial frame.

2. The computer-implemented method of claim 1, wherein transmitting, to the endpoint, the plurality of subsequent frames, consisting of only dependent frames, comprises transmitting the dependent version of each subsequent selected frame that is transmitted after the particular selected frame.

3. The computer-implemented method of claim 1, further comprising, transmitting the dependent version of the particular selected frame to one or more pre-existing endpoints that joined the real-time video session prior to the transmission of the particular selected frame.

4. The computer-implemented method of claim 3, wherein, for each of the pre-existing endpoints:
   the pre-existing endpoint had received, as its initial frame upon joining the real-time video session, an independent version of a previous selected frame; and
   after receiving the independent version of the previous selected frame, the pre-existing endpoint receives only dependent versions of each subsequently transmitted selected frame as long as the pre-existing endpoint maintains its connection to the real-time video session.

5. The computer-implemented method of claim 1, wherein:
   the independent version comprises an intra-coded picture frame; and
   the dependent version comprises a predicted picture frame.

6. The computer-implemented method of claim 1, wherein the selected frames are interspersed among the non-selected frames at a predetermined frequency.

7. The computer-implemented method of claim 6, wherein the selected frames are interspersed such that the selected frames are evenly interspersed among the non-selected frames.

8. The computer-implemented method of claim 1, further comprising, configuring each dependent frame that follows a selected frame to not refer to any frame prior to the selected frame.

9. The computer-implemented method of claim 1, further comprising:
   after transmitting the plurality of subsequent frames consisting of only dependent frames, determining that the endpoint has disconnected from the real-time video session and then reconnected to the real-time video session;
   in response to determining that the endpoint has reconnected to the real-time video session after disconnecting from the real-time video session, transmitting an additional initial frame that takes the form of an independent frame; and after transmitting the additional initial frame, transmitting an additional plurality of subsequent frames consisting of only dependent frames such that the only independent frame transmitted to the endpoint, while the endpoint maintains its re-connection to the real-time video session, is the additional initial frame.

10. The computer-implemented method of claim 1, wherein:

the real-time video session comprises a live streaming session and the real-time video stream comprises a live media stream;

the method further comprises enabling a member of a social networking platform to broadcast the live media stream as part of a social media post created by the member; and determining that the endpoint is attempting to join the real-time video session comprises determining that the endpoint is attempting to access the social media post.

11. The computer-implemented method of claim 1, wherein:

the real-time video session comprises a real-time video conference between a plurality of endpoints; and determining that the endpoint is attempting to join the real-time video session comprises determining that the endpoint is attempting to join the real-time video conference.

12. A system comprising:

a streaming module, stored in memory, that:
  selects a subset of frames within a real-time video stream of a real-time video session;
  for each selected frame, maintains two versions of the selected frame, the two versions comprising an independent version and a dependent version;
  for each non-selected frame, maintains only a dependent version of the non-selected frame;

a determination module, stored in memory, that determines that a new endpoint is attempting to join the real-time video session, wherein joining the real-time video session comprises receiving the real-time video stream;

wherein the streaming module further adds the endpoint to the real-time video session by:
  transmitting, to the endpoint, an initial frame that takes the form of an independent frame, wherein the initial frame comprises the independent version of a particular selected frame; and
  after transmitting the initial frame, transmitting a plurality of subsequent frames consisting of only dependent frames such that the only independent frame transmitted to the endpoint while the endpoint maintains its connection to the real-time video session is the initial frame; and at least one physical processor configured to execute the determination module and the streaming module.

13. The system of claim 12, wherein the streaming module transmits, to the endpoint, the plurality of subsequent frames, consisting of only dependent frames, at least in part by transmitting the dependent version of each subsequent selected frame that is transmitted after the particular selected frame.

14. The system of claim 12, wherein the streaming module further transmits the dependent version of the particular selected frame to one or more pre-existing endpoints that joined the real-time video session prior to the transmission of the particular selected frame.

15. The system of claim 14, wherein, for each of the pre-existing endpoints:

the pre-existing endpoint had received, as its initial frame upon joining the real-time video session, an independent version of a previous selected frame; and after receiving the independent version of the previous selected frame, the pre-existing endpoint receives only dependent versions of each subsequently transmitted selected frame as long as the pre-existing endpoint maintains its connection to the real-time video session.

16. The system of claim 12, wherein:

the independent version comprises an intra-coded picture frame; and the dependent version comprises a predicted picture frame.

17. A non-transitory computer-readable medium comprising one or more computer-readable instructions that, when executed by at least one processor of a computing device, cause the computing device to:

select a subset of frames within a real-time video stream of a real-time video session;

for each selected frame, maintain two versions of the selected frame, the two versions comprising an independent version and a dependent version;

for each non-selected frame, maintain only a dependent version of the non-selected frame;

determine that a new endpoint is attempting to join the real-time video session, wherein joining the real-time video session comprises receiving the real-time video stream; and add the endpoint to the real-time video session by:

transmitting, to the endpoint, an initial frame that takes the form of an independent frame, wherein the initial frame comprises the independent version of a particular selected frame; and after transmitting the initial frame, transmitting a plurality of subsequent frames consisting of only dependent frames such that the only independent frame transmitted to the endpoint while the endpoint maintains its connection to the real-time video session is the initial frame.

18. The computer-implemented method of claim 1, wherein the independent version of the particular selected frame is created by reconstructing the dependent version of the particular selected frame and creating a lossless encode of the reconstruction frame.

19. The computer-implemented method of claim 1, wherein the independent version of the particular selected frame is created by reconstructing the dependent version of the particular selected frame and creating a re-encoded version of the reconstructed frame.

20. The computer-implemented method of claim 1, wherein an original frame corresponding to the particular selected frame is encoded twice to create both the independent version and the dependent version of the original frame.

* * * * *